3,706,816
MANUFACTURE OF 1,1,1-TRICHLOROETHANE
Alastair Campbell and Rosemary Angela Carruthers, Runcorn, England, assignors to Imperial Chemical Industries Limited, London, England
No Drawing. Filed Sept. 22, 1969, Ser. No. 860,032
Claims priority, application Great Britain, Oct. 9, 1968, 47,796/68, 47,797/68
Int. Cl. C07c 17/00
U.S. Cl. 260—658 R                 1 Claim

ABSTRACT OF THE DISCLOSURE

An integrated process for the manufacture of 1,1,1-trichloroethane based on ethylene and chlorine. Chlorine is reacted with ethyl chloride and 1,1-dichloroethane in an unpacked reaction zone. A light fraction from the chlorination zone comprising ethylene and chloroethylenes together with ethylene feedstock are reacted with HCl and the resulting ethyl chloride and 1,1-dichloroethane are fed to the chlorination zone.

---

This invention relates to a process for the manufacture of 1,1,1-trichloroethane.

A feed material which is basically ethane and/or 1,1-dichloroethane may be chlorinated to give 1,1,1-trichloroethane but such processes are not very satisfactory in that use of ethane is associated with evolution of large amounts of HCl and in any event the yields of 1,1,1-trichloroethane are not high.

We have now discovered a new process for the manufacture of 1,1,1-trichloroethane based essentially on ethylene and chlorine as raw materials. The process of the invention is an integrated, continuous one which minimises net make of hydrogen chloride and produces 1,1,1-trichloroethane in high yield. This process involves the hydrochlorination of ethylene (and of chloroethylenes associated therewith as disclosed hereinafter) and also involves the chlorination of chloroethanes, of which ethyl chloride obtained from the hydrochlorination step is an important component.

According to the present invention therefore we provide a process for the manufacture of 1,1,1-trichloroethane which comprises:

(a) Thermally chlorinating a feed comprising ethyl chloride or mixtures thereof with 1,1-dichloroethane in a reaction zone;

(b) Fractionally separating from the crude product from (a) a light fraction comprising ethylene, vinyl chloride, vinylidene chloride, and hydrogen chloride and a heavy fraction comprising mainly 1,1,1-trichloroethane and other chlorinated ethanes;

(c) Hydrochlorinating ethylene and said light fraction of step (b);

(d) Withdrawing a reaction product from (c) comprising ethyl chloride, 1,1-dichloroethane and 1,1,1-trichloroethane;

(e) Fractionally separating the 1,1,1-trichloroethane from the heavy fraction of step (b);

(f) Fractionally separating the 1,1,1-trichloroethane from the crude reaction product from step (d) and returning the residual components of said product comprising ethyl chloride and 1,1-dichloroethane to the chlorination zone.

One suitable manner of carrying out the chlorination step comprises chlorinating ethyl chloride or mixtures of ethyl chloride and 1,1-dichloroethane in an empty reactor at a temperature in the range 375° C. to 475° C.

To provide for a thermodynamically balanced reaction in the chlorination step the organic reactants may be heated to temperatures at which they vaporise and then they are injected into the reactor. The particular vaporisation temperature will depend on the pressure at which they are vaporised and on the precise composition of the feed. Vaporisation temperatures of 55° C. to 65° C. may be employed at atmospheric pressure. Indeed part of the feed may be injected into the reactor in the liquid form.

In the present invention surprisingly high ratios of $Cl_2$/organic feed can be used without causing the reaction temperature to rise too highly while at the same time carbon formation is low; the yield of methylchloroform is high and little chlorine passes through the reactor unchanged. Useful results may be obtained with molar ratios of $Cl_2$/organics of greater than 0.5:1 and up to 1.5:1. Preferably molar ratios of $Cl_2$/organics in the range 0.8:1 to 1.2:1 are employed. With a mixture of ethyl chloride and 1,1-dichloroethane this means that the molar ratios of $Cl_2$/1,1-dichloroethane are higher still. Useful results are obtained in the present process when the molar ratios of ethyl chloride/1,1-dichloroethane are in the range 1:1 to 5:1 and especially when the molar ratios of ethyl chloride to 1,1-dichloroethane are in the range 1.5:1 to 2.5:1. 1,1-dichloroethane formed by reaction of $Cl_2$ with ethyl chloride or unconverted 1,1-dichloroethane can be returned to the reactor.

Preferably we employ reaction temperatures in the range 400° C. to 450° C. If desired heat exchange means may be used inside and outside the reactor to help maintain the temperatures in the desired range. Contact times of at least 5 seconds are usually employed and good results are obtained when using contact times of 7.5 to 30 seconds although longer contact times may be used if desired. Such times are based on the total volume of vaporised feed assuming it to be at 100° C.

When employing an empty reactor (not relying on turbulent or cyclic flow) and said reaction temperatures very good results are obtained in that there is high conversion of ethyl chloride and 1,1-dichloroethane to methylchloroform and the degree of formation of unwanted 1,2-dichloroethane and the subsequent formation of $\beta$-trichloroethane and tetrachloroethane is quite small. While useful overall results may be obtained in the integrated process when using other chlorination techniques such as those involving fluid beds the results obtained are not as good as when using an empty reactor. Thus with fluid beds it is usually necessary to utilise low molar ratios of $Cl_2$/1,1-dichloroethane of the order of 0.25:1 to 0.4:1 in order to control the reaction and to avoid deposition of carbon and tars. There is also difficulty due to formation of larger amounts of 1,2-dichloroethane which is extremely difficult to separate from 1,1,1-trichloroethane.

Preferably the hydrochlorination step is carried out in a non-aqueous liquid medium containing a Friedel-Crafts catalyst. Preferably also the hydrochlorination of the ethylene feed of the process and the hydrochlorination of the light fraction comprising ethylene, vinyl chloride, vinylidene chloride and hydrogen chloride and which may also contain a small amount of other chlorinated hydrocarbons such as symmetrical dichloroethylene and 1,1-dichloroethane are carried out in the same hydrochlorination zone. The light fraction is derived from the chlorination zone and the hydrogen chloride contained therein is more than sufficient to react with the ethylene feed and the unsaturated components of the light fraction.

The non-aqueous liquid medium in the hydrochlorination reactor may be any inert organic liquid such as, for example, chlorinated hydrocarbons, including mixtures of ethyl chloride, 1,1-dichloroethane and 1,1,1-trichloroethane. In fact mixtures of these last three materials are formed by reaction of HCl with the various unsaturated bodies fed to the hydrochlorinator. Again other inert organic liquids such as polar organic solvents containing at least one nitro (—NO₂) group e.g. nitrobenzene which forms a complex with FeCl₃ may be used in the hydrochlorinator. The Friedel-Crafts catalyst employed is suitably ferric chloride. While aluminium chloride may be used it is not preferred in view of a tendency to degrade vinylidene chloride by causing tar formation.

Atmospheric or superatmospheric pressures may be used in the chlorination and hydrochlorination zones. Suitable temperatures in the range 20° C. to 70° C. are employed in the hydrochlorination zone. Temperatures in the range 20° C. to 40° C. give good results when the hydrochlorination is effected at atmospheric pressure. Vinylidene chloride may be tapped off as a useful product before the hydrochlorination step.

A crude product in the liquid form may be withdrawn from the hydrochlorinator and may be freed from the metal chloride catalyst by conventional means for example by flash evaporation, steam distillation, or by water washing.

The heavy fraction of step (b) contains apart from 1,1,1-trichloroethane surprisingly little 1,2-dichloroethane and only a small amount of higher chlorinated ethanes and unreacted 1,1-dichloroethane. Conveniently this fraction and the reaction product of step (d), if desired after removal of and HCl, are both distilled in a fractionation unit to recover the 1,1,1-trichloroethane.

The following example illustrates but does not limit the invention; parts and percentages are by weight:

EXAMPLE

The following procedure is illustrative of operational details applicable to a continuous and recycle process, a simulated recycle being used only for purposes of simplifying experimental procedure. Into the bottom of a vertical reactor 75 cm. long and 5 cm. internal diameter were passed via a short T-piece 100 parts of chlorine at ambient temperature and a vaporised chloroethane feed at 60° C. containing 55 parts of ethyl chloride and 56 parts 1,1-dichloroethane. This represented a molar ratio of C₂H₅Cl/C₂H₄Cl₂ of 1.5:1 and a molar ratio of Cl₂/organic feed of 1.0:1. At the inlet of the reactor the temperature was 130° C. but built up to a temperature of 400° C. to 420° C. The contact time was 10 seconds based on the total vaporised feed assuming the feed to be vaporised at 100° C. The gaseous exit product was found to contain 4 parts C₂H₄, 33 parts C₂=CHCl, 27 parts CH₂=CHCl₂, 2 parts sym. dichloroethylenes, 5 parts 1,1-dichloroethane and 79 parts HCl, corresponding to a light fraction, and 52 parts 1,1,1-trichloroethane and only 0.2 part tetrachloroethanes, 0.2 part of 1,2,2-trichloroethane and 0.2 part 1,2-dichloroethane, corresponding to a heavy fraction.

Into a hydrochlorinator there were placed 20 parts nitrobenzene and 1 part ferric chloride. 20 parts of ethylene in addition to a simulated recycle corresponding to the light fraction were passed into the hydrochlorinator which was maintained at a temperature of 30° C. There was withdrawn a crude liquid product containing 35 parts 1,1,1-trichloroethane, 55 parts ethyl chloride and 51 parts 1,1-dichloroethane. The mixture after removal of FeCl₃ and after fractional distillation could provide substantially all the ethyl chloride and 1,1-dichloroethane needed for the organic feed for the chlorinator. Again there was available by distillation 52 parts 1,1,1-trichloroethane from the heavy fraction from the chlorinator.

There was thus obtained a total of 87 parts 1,1,1-trichloroethane representing yields of 91% and 93% on the ethylene and chlorine, respectively, fed to the system.

What we claim is:

1. A continuous process for the manufacture of 1,1,1-trichloroethane consisting of
   (a) thermally chlorinating a stream of organic feed consisting of the residual components recycled from steps (f) below and comprising ethyl chloride and 1,1-dichloroethane in an unpacked chlorination zone at a temperature in the range of 375° C. to 475° C. using a molar ratio of chlorine to organic feed greater than 0.5:1 and up to 1.5:1 and of ethyl chloride to 1,1-dichloroethane of 1:1 to 5:1;
   (b) fractionally separating from the crude product from (a) a light fraction consisting essentially of ethylene, vinyl chloride, dichloroethylenes, 1,1-dichloroethane, vinylidene chloride and hydrogen chloride and a heavy fraction comprising mainly 1,1,1-trichloroethane and other chloroethanes;
   (c) passing fresh ethylene feed and said light fraction of step (b) at a temperature within the range of 20° to 70° C. through a hydrochlorination zone containing a non-aqueous medium containing a Friedel-Crafts catalyst;
   (d) withdrawing the reaction products from step (c), said product comprising ethyl chloride, 1,1-dichloroethane and 1,1,1-trichloroethane;
   (e) fractionally separating the 1,1,1-trichloroethane from the heavy fraction of step (b);
   (f) fractionally separating the 1,1,1-trichloroethane from the crude reaction product of step (d) and returning residual components of said product comprising ethyl chloride and 1,1-dichloroethane to the chlorination zone.

References Cited

UNITED STATES PATENTS

| | | | |
|---|---|---|---|
| 3,059,035 | 10/1962 | Benner et al. | 260—658 R |
| 3,304,337 | 2/1967 | Jordan et al. | 260—658 R |
| 3,012,081 | 12/1961 | Conrad et al. | 260—658 R |
| 3,012,080 | 12/1961 | Bergeron | 260—658 R |
| 2,209,000 | 7/1940 | Nutting et al. | 260—658 R |

HOWARD T. MARS, Primary Examiner

J. A. BOSKA, Assistant Examiner

U.S. Cl. X.R.

260—663